Sept. 27, 1966     R. V. FENTON ETAL     3,274,837
CONTROL APPARATUS

Filed June 1, 1962                              3 Sheets-Sheet 1

INVENTORS
RALPH V. FENTON
WILLIAM H. ISELY
BY Roger W. Jensen
ATTORNEY.

Sept. 27, 1966    R. V. FENTON ETAL    3,274,837
CONTROL APPARATUS

Filed June 1, 1962    3 Sheets-Sheet 3

INVENTOR.
RALPH V. FENTON
WILLIAM H. ISELY
BY Roger W. Jensen
ATTORNEY.

United States Patent Office 3,274,837
Patented Sept. 27, 1966

3,274,837
CONTROL APPARATUS
Ralph V. Fenton, Indian Rocks, and William H. Isely, Clearwater, Fla., assignors to Honeywell Inc.
Filed June 1, 1962, Ser. No. 199,502
7 Claims. (Cl. 74—5.7)

This invention pertains to means for reducing drift in gyroscopic devices and systems, and more particularly to means for counteracting reaction torque in the spin motors of gyroscopic device.

In gyroscopic devices such as gyros and pendulous gyro accelerometers all of the unwanted forces which produce torques about the gyro output axis are grouped under a general heading known as drift. The present invention is concerned with drift caused by spin motor reaction torque.

The spin motors in gyroscopic devices are generally of the type which have a stator capable of being energized by two or more phases of A.C. power and a rotor which has magnetic poles induced therein by the energized stator. An example of such a motor is a synchronous hysteresis motor. Leakage flux within the components of the spin motor set up magnetic field within the gyroscopic device which because of asymmetries within the components, such as nonhomogeneous material, produce flux fields that are not symmetrical and interact with the case and structure to produce reaction torque or torque about the output axis. Until the present time this reaction torque was believed to be purely random.

It has been discovered by the applicants that each time the motor is energized the reaction torque has a different value and that this random variation of the reaction torque causes a random drift which heretofore was impossible to counteract. Through much research the applicants found that the changes in reaction torque from runup to runup were a function of the amount of slip of the rotor with relation to the stator and that the magnitude of the reaction torque was determined by the physical location of the magnetic poles on the rotor at synchronous speed, or at running speed.

Since the magnitude of the reaction torque is determined by the physical location of the induced magnetic poles within the rotor at operating speeds any factors causing the rotor to slip slightly, thereby changing the physical location of the rotor poles, will change the magnitude of the reaction torque. Examples of factors which might change the reaction torque are interruptions in stator energization, variations in load, or variations in the phase reference angle of the power applied to the stator of the motor. Since most of these factors are random during normal operation of the motor the changes in reaction torque are random and, therefore, cause a random drift in the gyroscopic device.

The present invention eliminates the random drift of the gyroscopic devices caused by the random reaction torque by periodically shifting the position of the induced magnetic poles within the rotor of the spin motor. One possible method of accomplishing this is to periodically interrupt one phase of the energization to the stator of the motor. It should be noted that one skilled in the art could devise many methods of physically shifting the position at which the magnetic poles are induced in the rotor and the applicants do not wish to restrict their application to the methods which are shown.

Since the magnitude of the reaction torque is different for each physical location of the magnetic poles induced into the rotor, by periodically shifting the position at which the poles are induced the magnitude of the reaction torque becomes a periodic function. This can be seen from the fact that as the induced poles shift about the rotor they will, upon each complete rotation, return to the same position, thus, producing the same magnitude of reaction torque. Therefore, by periodically causing the induced rotor poles to shift position on the rotor the magnitude of the reaction torque becomes a periodic function and therefore has a time average equal to some constant value. It should be noted that since the magnitude of the reaction torque will no longer be random but will be predictable, compensation can easily be introduced into the system. Thus, it can be seen that the present invention can greatly reduce drift in gyroscopic devices by eliminating spin motor reaction torque.

It is a primary object of this invention to provide an improved control apparatus.

It is a further object of this invention to provide means for greatly reducing drift in gyroscopic devices.

It is a further object of this invention to provide means for eliminating the effect of spin motor reaction torque on a gyroscopic system by reducing the reaction torque to a predictable periodic function which can be compensated.

Still a further object of this invention is to provide means for eliminating reaction torque in motors having magnetic poles induced into the rotors by the energization of the stator.

These and other objects of this invention will become apparent from the following description of a preferred form thereof and the accompanying specification, claims, and drawings, of which:

Figure 1:
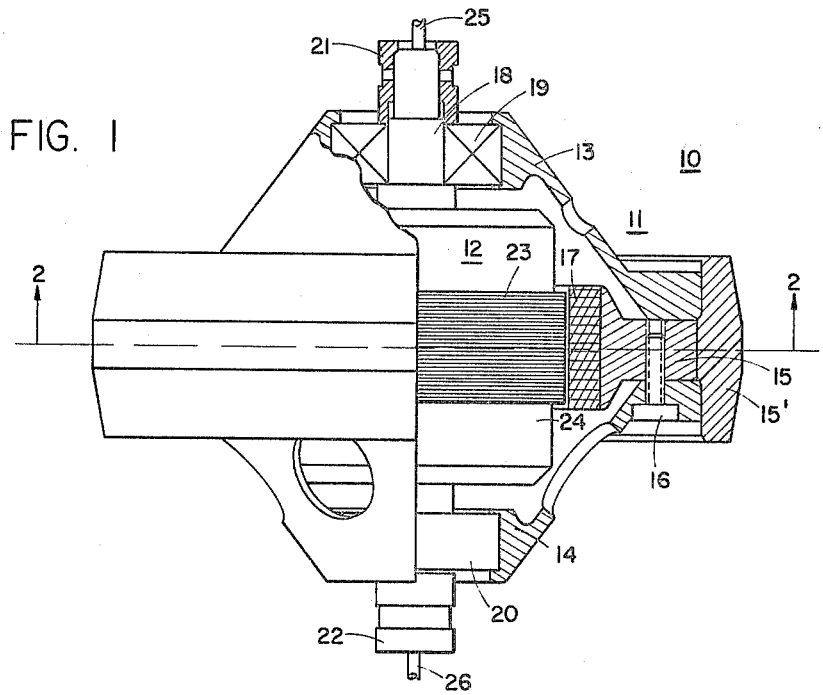
FIGURE 1 is a partial breakaway view of a complete spin motor.

In FIGURE 1 a spin motor 10 is shown having a rotor 11 and a stator 12. Rotor 11 is comprised of a pair of bell-shaped housings 13 and 14 attached to a cylindrical shaped support member 15 by some convenient means such as screws 16. Cylindrical shaped support member 15 fits within a cylindrical shaped mass element 15'. Mass element 15' is attached to support member 15 by some convenient means such as press fitting. Mass element 15' has a high inertia and maintains the rotor 11, once started, at a substantially constant speed. Permanently attached to the inner diameter of cylinder 15 is a hysteresis ring 17 which, in this preferred embodiment, forms the only portion of rotor 11 which is comprised of magnetic material. Rotor 11 is mounted by means of bell 13 and bell 14 each of which are rotatably attached to a relatively stationary shaft 18 by means of a bearing 19 and a bearing 20 respectively. Shaft 18 is fixed on either end, by mounting means 21 and 22, in the device for which the spin motor 10 is designed, such as a gimbal of a gyro. Shaft 18 further mounts stator 12 within hysteresis ring 17 so that rotor 11 is free to rotate and hysteresis ring 17 rotates with rotor 11 and concentric with stator 12. Thus an annular air gap is defined between the O.D. of stator 12 and the I.D. of hysteresis ring 17. Stator 12 is comprised of a core 24 and windings 23. In the present embodiment shaft 18 is at least partially hollow and has the connections 25 and 26 to windings 23 extending through the ends thereof. Windings 23 are comprised of at least three coils connected to be energized by a three phase source of power, also the connections 25 and 26 actually have three separate conductors therein but have been shown as a separate lead for convenience.

Figure 2:
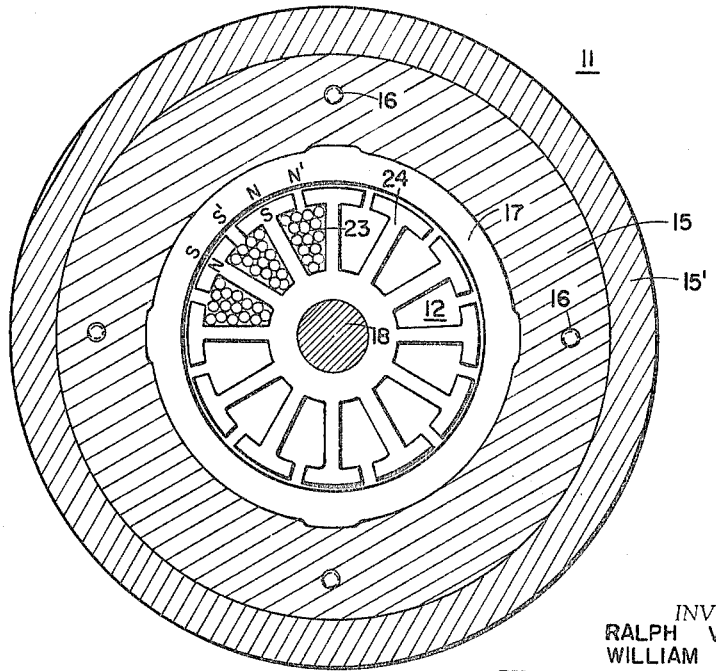
FIGURE 2 is a cross sectional view along section line 2—2 of FIGURE 1.

Assume that the windings 23 are energized by some polyphase source to produce a rotating magnetic field, in the manner well known in the art. Further assume that at the instant the windings 23 are energized poles are set up in the stator and the rotor as shown in FIGURE 2 due to flux produced by the windings 23. Only the windings and polarity of two poles on the stator and the rotor are shown to simplify the drawing. However, it should be understood that the windings 23 will encircle all of the poles of stator 12. At some moment after the initial energization of the windings 23 the alternating current in the windings 23 will cause the poles shown in stator 12 to reverse, that is, the south pole will become a north pole and the north pole will become a south pole. Because of hysteresis in ring 17 the poles previously induced in ring 17 will retain substantially the same position and because of interaction between the stator and the rotor, rotor 11 will begin to rotate. This rotation will continue as long as the windings 23 are energized, rotor 11 rotating at the synchronous speed of the rotating magnetic field except as discussed below.

If the energization source to the windings 23 should be interrupted momentarily or shut off completely there would no longer be magnetic poles in the stator and the induced poles in the rotor 17 would have time to degenerate. If the energization source to the windings 23 is again applied poles will again be produced in the stator 12 which will again induce poles in the hysteresis ring 17. However, because of mass 15' rotor 11 will continue to rotate for a short time after the windings 23 are de-energized. This continued rotation will cause a different portion of hysteresis ring 17 to align, radially, with the poles of the stator 12. Upon the re-energization of the windings 23 the poles of the stator 12 will induce poles in hysteresis ring 17 at a different position. This is denoted in FIGURE 2 by an N' and an S'. When the windings 23 were energized the first time the south pole produced in stator 12 induced a north pole in hysteresis ring 17 and when the windings 23 were energized a second time, after de-energization, the south pole produced in stator 12 induce an N' pole in hysteresis ring 17. It should be noted that the position at which poles are induced in hysteresis ring 17 will change each time the windings 23 are de-energized and re-energized and will vary with the length of time the windings 23 are de-energized. Thus, for normal operation the position at which poles are induced in the hysteresis ring is purely random. The poles induced in hysteresis ring 17 will also change position slightly while the motor is operating because of slip in the motor due to excessive load, nonhomogeneous bearings, or variations in the energization source.

Figure 3:
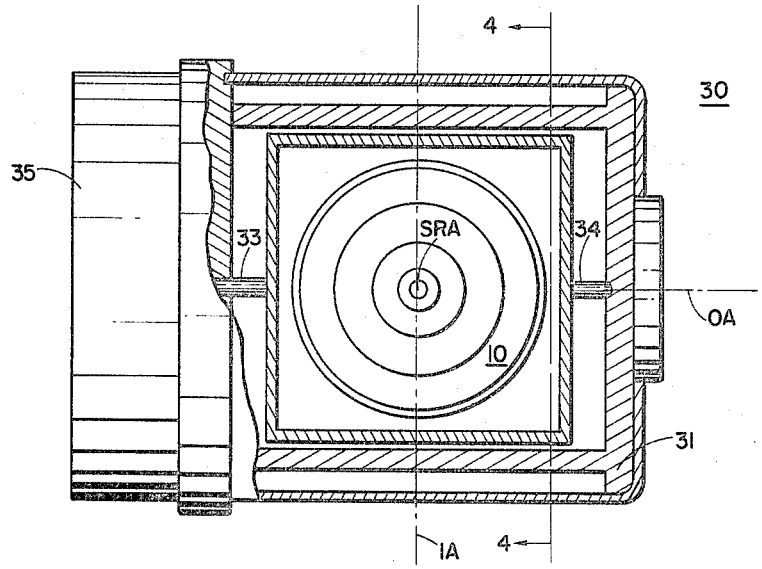
FIGURE 3 is a view, partially in section, of a floated gyro and illustrating the orientation of the spin motor and gimbal.

In the present invention spin motor 10 is utilized in some inertial device such as a gyro 30 shown in FIGURE 3. Gyro 30 is comprised of an outer hollow cylindrical case 31 within which is mounted a hollow cylindrical gimbal element 32. Gimbal element 32 is rotatably mounted to the outer case 31 by means of bearings 33 and 34. Bearings 33 and 34 are generally of the pivot and jewel type to reduce friction. Gimbal element 32 is floated in a fluid having a specific gravity approximately equal to the overall specific gravity of gimbal element 32 to further reduce friction at bearings 33 and 34.

Figure 4:
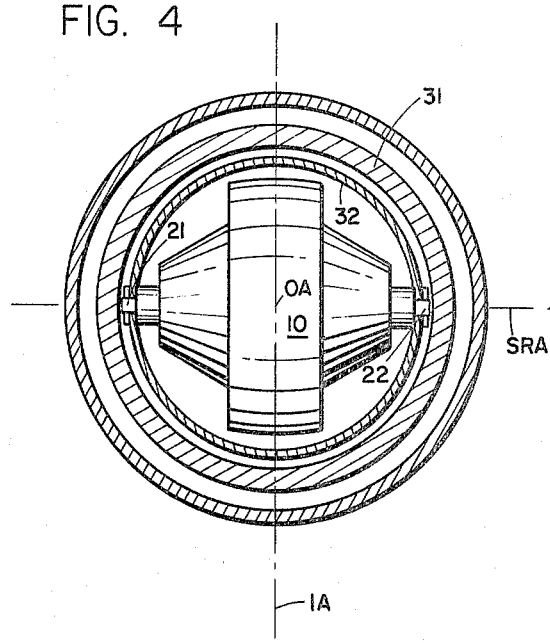
FIGURE 4 is a view of the gyro taken along section line 4—4 of FIGURE 3.

Spin motor 10 is mounted within gimbal element 32 by any suitable mounting means such as a pair of shaft extensions 21 and 22 which can be more clearly seen in FIGURE 4. As is well known in the art, once the rotor 11 of spin motor 10 is revolving at the proper speed about the spin reference axis SRA any rotation of gyro 30 about the input axis will produce a rotation of gimbal element 32 about the output axis, the SRA; OA; and IA being mutually perpendicular. By picking off the amount of rotation about the OA the amount of rotation about the IA can be determined. This resulting rotation of the gimbal element 32 about the OA will be picked off by a device which may be contained within the portion of the case 31 designated numeral 35, and is not shown in detail here since it is not a portion of the invention. Any suitable pickoff can be used such as an electromagnetic type described in the Mueller Patent 2,488,734.

Since pickoff means 35 will detect any rotation of gimbal element 32 about the OA, any movements other than that produced by the effect of an angular movement about the IA are considered errors. These errors are sometimes known as drift because they cause the gyro to appear to be moving, due to a motion about the OA, when no real input turning motion is being applied to the gyro about the IA. By utilizing the present invention one of the sources of drift or error can be substantially eliminated.

Figure 5:
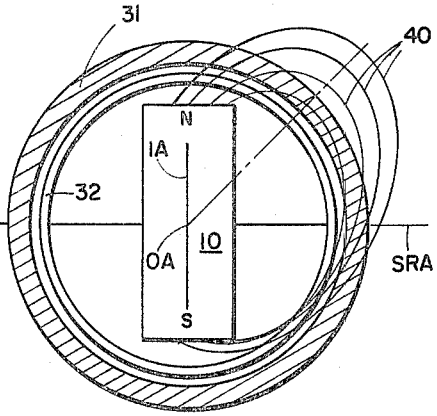
FIGURE 5 is a somewhat schematic representation of the asymmetric flux field.

In FIGURE 5 a somewhat schematic view of the gyro shown in FIGURES 3 and 4 is presented to simplify the following explanation. Spin motor 10 is represented by a simple bar magnet, also designated 10, contained within gimbal element 32. Bar magnet 10 produces a flux field which leaves the north pole, designated N, and enters the south pole, designated S. Because gimbal element 32 and case 31 of gyro 30 are generally composed of magnetic materials the flux from the bar magnet 10 in FIGURE 5 will tend to flow through at least a portion of gimbal element 32 and case 31, as shown by flux lines 40. However, because the materials, of which gimbal element 32 and case 31 are constructed, are not perfectly homogeneous and because gimbal element 32 and case 31 have other imperfections the lines of flux 40 from the bar magnet 10 will have a tendency to be asymmetric one possible configuration of which is shown in FIGURE 5. It should be noted that the asymmetry of the flux field in FIGURE 5 is simply for explanation and the actual flux field in a gyro would be much more complicated. Because of the asymmetry of the flux field in FIGURE 5 a torque will be produced on bar magnet 10 in a counterclockwise direction about the OA tending to align the rotors members 31 and 32 with the bar magnet 10 so that the flux field will be symmetrical. This torque about the OA is known as reaction torque and will produce an error or drift in the output reading of the gyro. When the bar magnet 10 in FIGURE 5 is replaced with an actual spin motor 10 a much more complicated flux pattern will appear due to the larger number of poles in the spin motor 10.

The flux field which is produced in gyro 30 is due to leakage flux passing through hysteresis ring 17 and will be directly effected by the position of the poles induced into hysteresis ring 17 by the magnetic poles in stator 12. It should be noted that once the windings 23 are energized and poles are induced into hysteresis ring 17 the leakage flux pattern produced in gimbal element 32 and case 31 will remain relatively stationary until something causes the induced poles in hysteresis ring 17 to shift position. As long as the leakage flux pattern produced in gimbal element 32 and case 31 is relatively stationary the torque about the OA is constant. However, as the poles in the hysteresis ring 17 shift position the leakage flux through gimbal element 32 and case 31 shifts and this shift can cause the flux pattern to change radically in almost any direction due to the nonhomogeneous composition of gimbal element 32 and case 31. This shifting of the flux pattern will in turn cause a change in the torque about the OA and a different amount of error or drift in the gyro.

Figure 6:
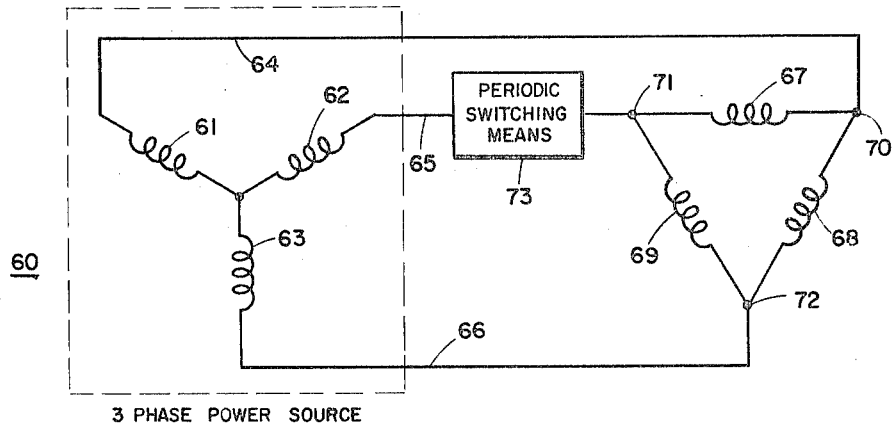
FIGURE 6 is a schematic diagram of three spin motors connected to a three phase power source and a preferred embodiment of the present invention.

A preferred embodiment of the present invention is shown in FIGURE 6. A three-phase power source 60 has three windings 61, 62 and 63 "Y-connected" to produce three phases of power on the output leads 64, 65 and 66 respectively. In general, when the gyroscopes or other inertial devices are utilized in an inertial system the spin motors of the inertial devices are "Δ connected" as shown in FIGURE 6. In the event that more than one gyroscope is to be used in an inertial system the windings of the spin motors would simply be connected in parallel with the windings of the single motor to be explained. Thus, the "Δ connected" spin motor in FIGURE 6 can be thought of as a plurality of spin motors connected in parallel but represented by single windings.

A first winding 67 of the spin motor has one end connected to one end of a second winding 68 at a junction point 70. The other end of the winding 67 is connected to one end of a third winding 69 at a junction point 71. The other end of the winding 68 and the other end of the winding 69 are connected together at a junction point 72. Lead 64 from the three-phase power source 60 having a first phase of power thereon is connected to junction point 70. Lead 66 from three-phase power source 60 having a second phase of power thereon is connected to junction point 72. Lead 65 from three-phase power source 60 having a third phase of power thereon is connected to a periodic switching means 73 and periodic switching means 73 is connected to junction point 71. Switching means 73 may be any device, such as a relay energized by periodic pulses or a semiconductor switch which operates periodically, which will periodically remove power from junction point 71 due to the phase of power on lead 65.

By periodically removing a phase of power to the windings of the spin motors the poles induced in the hysteresis rings of the spin motors will periodically change position and the reaction torque of each of the spin motors in each inertial device will periodically change value. Since the shifting of reaction torque is periodic rather than random the error in the gyro reading produced by this reaction torque will be predictable. It can be seen in the simplified drawing of a spin motor in FIGURE 5, by periodically shifting the position of the bar magnet or simplified stator 10 with respect to the hysteresis ring 32 a complete rotation will be made and eventually the initial position of bar magnet 10 and hysteresis ring 32 will again be reached. Thus, when the initial position is again reached the reaction torque will again be the same and a second cycle will begin. If the reaction torque is plotted as the power to the windings of the stator is periodically interrupted it will be noted that the reaction torque will follow a predictable curve. Therefore, by periodically interrupting the power to the spin motors or by periodically causing the rotor to slip with respect to the stator the reaction torque becomes a predictable function rather than a random function. In many cases the average value of this predictable function will be small and can be ignored, but in any case since the function is predictable compensation can easily be introduced if necessary.

Figure 7:
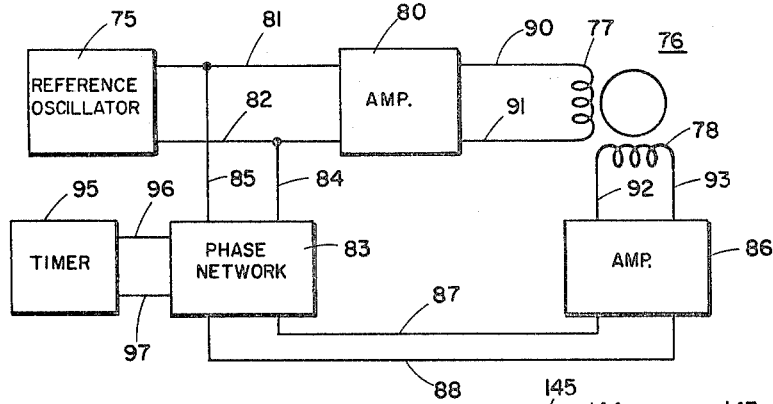
FIGURE 7 is a block diagram of an alternative embodiment of the present invention.

In FIGURE 7 a reference oscillator 75 is the energization source for a spin motor 76 having a first winding 77 and a second winding 78. Spin motor 76 is the normal type of hysteresis motor which has been previously explained and is made to rotate in the normal manner by simply energizing winding 78 with an energization source substantially out of phase with the energization source energizing winding 77. Reference oscillator 75 is connected to a first amplifier 80 by means of a pair of leads 81 and 82. Reference oscillator 75 is also connected to a phase network 83 by means of a pair of leads 84 and 85. Phase network 83 is any network which will effectively shift the phase of the reference oscillator 75 and may be for example a capacitive circuit. Phase network 83 is further connected to a second amplifier 86 by means of a pair of leads 87 and 88. First amplifier 80 is connected to winding 77 of spin motor 76 by a pair of leads 90 and 91. Second amplifier 86 is connected to the second winding 78 of spin motor 76 by means of a pair of leads 92 and 93. To incorporate the present invention in this normal connection of a single spin motor a timer 95 is connected to phase network 83 by means of a pair of leads 96 and 97. Timer 95 periodically causes phase network 83 to shift phase in a manner to cause slip in spin motor 76. This periodic slip of spin motor 76, as has been previously explained, makes the reaction torque produced by the leakage flux of spin motor 76 a predictable periodic function.

Figure 8:
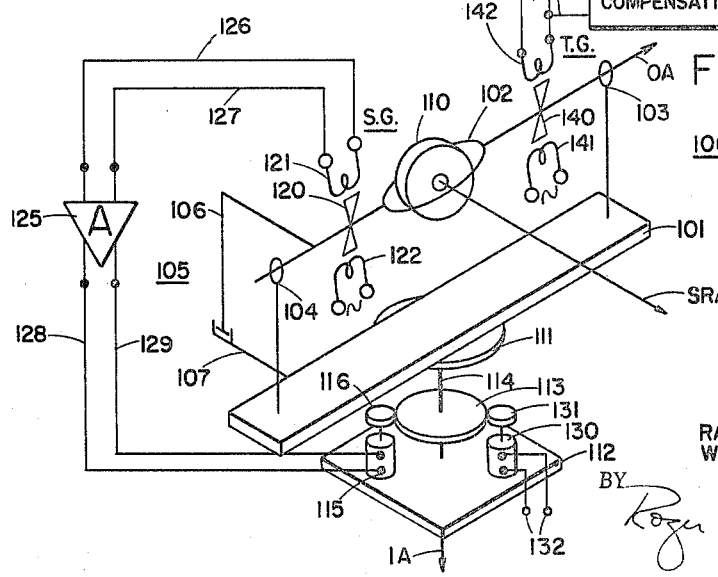
FIGURE 8 is a somewhat schematic view of a single axis platform containing a gyro and the present invention.

In FIGURE 8 a somewhat schematic diagram of a single axis platform is portrayed. Referring to FIGURE 8, reference numeral 100 designates a gyro. The gyro includes a gyro case 101 and a gimbal assembly 102. The support for the gimbal assembly 102 to facilitate rotation relative to the gyro case 101 about an output axis is schematically shown by a pair of supports 103 and 104 which define a pivotal or output axis OA. It will be understood generally that in the usual case the gimbal assembly 102 of the gyro will be floated in a damping fluid and this teaching is set forth in the Jarosh et al. Patent 2,802,956. The inherent viscous damping produced by floating gimbal assembly 102 with respect to case 101 is schematically represented by a damper 105 including a movable member 106, and a fixed member 107 which is connected to gyro case 101. Gimbal assembly 102 further includes a spin motor 110 adapted for rotation with respect to the gimbal assembly 102 about a spin reference axis SRA. Spin reference axis SRA is perpendicular to output axis OA. There is also a gyro input axis IA which is perpendicular to both the OA and the SRA. It is understood by those skilled in the art that movement of gyro case 101 about the IA will cause a precession of the gimbal assembly 102 about the OA.

Gyro case 101 is mounted on a suitable turntable device 111 and the turntable device is mounted for rotation about a turntable axis which pivots on a base 112. The turntable axis is provided by means of a gear train element 113 positioned on a shaft 114. Shaft 114 is rotatably supported by the base 112 and is fixedly connected to turntable 111. The axis is arranged so that the turntable axis is either parallel to or aligned with the gyro IA. A servomotor 115 is operably connected between the base 112 and the turntable 111 by means of a pinion gear 116 which meshes with gear train element 113.

A means for providing a signal indicative of the amount of rotation of gimbal assembly 102 about the OA is provided. The signal generator SG includes a rotor element 120 connected to gimbal assembly 102, and a pair of windings 121 and 122. Winding 122 schematically represents an excitation winding which is energized by a suitable source of alternating current and winding 121 schematically represents an output winding adapted to have induced therein an alternating signal of variable phase and magnitude indicative respectively of the sense and magnitude of rotation of gimbal assembly 102 about the OA. Output winding 121 of signal generator SG is connected to an amplifier 125 by means of a pair of leads 126 and 127. Amplifier 125 is further connected to servomotor 115 by means of a pair of leads 128 and 129. Rotor element 120 of the signal generator SG produces a signal upon rotation of gimbal element 102 thereby causing a signal to be sent to amplifier 125 where the signal is amplified and is used to cause motor 115 to rotate. Since the signal is of a certain phase and magnitude, motor 115 will cause turntable 111 to rotate relative to base 112. The gyro 100 will be rotated about its IA in a direction so that the gimbal assembly 102 will be precessed about its OA, in a direction so as to return the gimbal towards its initial position.

The single axis platform depicted in FIGURE 8 thus is effective to stabilize the platform or case 101 in inertial space about the IA. Thus, for example, if the support 112 should be rotated in space about the IA, this would produce a corresponding precession of the gimbal about the OA producing in turn a signal in secondary winding 121 of the signal generator which would be (after amplification) applied to the servomotor 115. The servomotor 115 would be energized or actuated in a sense so as to rotate the case 101 with respect to the base 112 in a direction so as to maintain the position of case 101 fixed in space. As is well understood, by having the servo mechanism properly designed the servo action will function with substantially no time lag so that as the base 112 is rotated in space about the IA the servomotor 115 will simultaneously be effective to drive the case 101 relative to the base 112 so that there is no apparent movement in space of the case 101 about the input axis. Both a single axis platform as well as a more sophisticated three axis or complete inertial platform is described in considerable detail in the C. S. Draper et al. Patent 2,752,793.

It will be understood by those skilled in the art that any undesired torque, such as the spin motor reaction torque above described, about the OA will introduce unwanted errors in the overall gyro system. More specifically, in the single axis platform example, the drift of the gimbal about the OA caused by the reaction torque will generate an error signal in winding 121 which will be applied, after amplification, to the servomotor 115. It will be noted that the main base 112 has not moved at all with respect to inertial space about the IA. However, the servomotor has received a signal and accordingly will rotate the case 101 with respect to the base 112. Thus the gyro per se has been rotated in inertial space about the IA and further, an output signal at leads 132 will apply this error signal to any further elements in a control system with which the single axis platform is associated. In the more general case of a complete three-axis inertial system, the output signal from the individual platform gimbals (each of which is stabilized by a gyro) would be applied to other elements of the inertial system such as a computer for computing craft velocity and craft position (it being understood that acceleration sensing means are also provided in such inertial systems). It will be understood therefore that the spin motor reaction torque previously (due to its unpredictable nature) has been a vexing source of error to an overall inertial guidance system. With the present invention, the reaction torque is no longer unpredictable, but, on the contrary, is predictable and may be conveniently compensated for in the system as will now be explained.

In the present invention the energization source to spin motor 110, not shown, is periodically interrupted, as previously explained, which makes the reaction torque about the OA a predictable function. This reaction torque can then be compensated by applying a torque of equal and opposite direction directly to the OA. This compensating torque can be applied to the OA by means of a torque generator labeled TG in FIGURE 8. The torque generator TG includes a rotor 140 connected directly to the OA and a pair of windings 141 and 142. Winding 141 is an excitation winding and is adapted to be excited by a suitable source of alternating current. Winding 142 is a control winding and is adapted to be energized by a signal of variable phase and magnitude to cause rotation of gimbal assembly 102 about the OA. A compensation network 143 is connected to control winding 142 of torque generator TG by means of a pair of leads 144 and 145. Compensating circuits 143 may be any circuit which will produce a signal to energize torque generator TG sufficient to produce a torque on the gimbal about the OA equal and opposite to the reaction torque produced by spin motor 110.

It can be seen that by utilizing the present invention to make the errors due to reaction torque in the spin motor predictable, the errors can thus, be easily compensated for and a great reduction in errors of the overall system is accomplished.

While we have shown and described a specific embodiment of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

We claim:

1. An improvement in gyroscopic means comprising: a polyphase hysteresis spin motor; means for energizing said motor; means for periodically interrupting one phase of said motor; and means counteracting the effects on said gyroscopic means produced by periodically interrupting said one phase of said motor.

2. An improvement in a gyroscopic system comprising: gyroscopic means having a spin motor, said motor having a stator, means for energizing said stator, a rotor having magnetic poles induced therein by said energized stator, and means for periodically shifting the position within the rotor of said magnetic poles; a platform; means for positioning said platform in response to said gyroscopic means; and means counteracting the effects on said system produced by periodically shifting the position of said magnetic poles.

3. Means for reducing drift in a gyroscopic system comprising: gyroscopic means having signal generating means and a spin motor, said motor having a stator, a rotor capable of having magnetic poles induced therein by said stator, and means operable to periodically shift the position of the magnetic poles of said rotor with respect to said rotor; a platform having said gyroscopic means mounted thereon; positioning means connected to said platform and capable of causing a change of position therein; and means connecting said signal generating means to said positioning means in a manner to counteract the effects on said system produced by periodically shifting the position of said magnetic poles.

4. Means for reducing drift in a gyroscopic device comprising: a polyphase electric motor having a stator with a plurality of windings thereon, each of said windings having applied thereto a substantially different phase of power; a rotor having magnetic poles induced therein and rotating about a spin axis; and means periodically changing the phase of power applied to one of said windings, said periodic change of phase causing said induced poles in said rotor to periodically shift position within said rotor; signal generating means producing a signal when forces are applied to said gyroscopic device about an input axis, said input axis being substantially perpendicular to said spin axis; and means counteracting the effects on said signal generating means produced by periodically shifting said pole position within said rotor.

5. Inertial apparatus comprising a support mounted for rotation about a support axis; motor means connected between said support and a base and adapted when actuated to rotate said support about said support axis relative to said base; gyroscope means mounted on said support with an input axis thereof positioned to receive a component of rotation of said support about said support axis, said gyroscope means further including a gimbal adapted to rotate about an output axis, a signal generator means adapted to produce a signal indicative of gimbal rotation about said output axis, torque generating means adapted to cause upon actuation a torque to be applied to said gimbal about said output axis, and an electric spin motor on said gimbal including a stator and a rotor capable of having poles induced therein by said stator; means operatively connecting said signal generating means to said motor means; means periodically shifting the poles of said rotor with respect to said rotor to cause a predictable spin motor reaction torque to be applied to said gimbal about said output axis; and means for actuating said torque generating means so as to apply a compensating torque to said gimbal about said output axis which is substantially equal and opposite to said predictable spin motor reaction torque.

6. Inertial apparatus comprising a support mounted for rotation about a support axis; motor means connected between said support and a base and adapted when actuated to rotate said support about said support axis relative to said base; gyroscope means mounted on said support with an input axis thereof positioned to receive a component of rotation of said support about said support axis, said gyroscope means further including a gimbal adapted to rotate about an output axis, a signal generator means adapted to produce a signal indicative of gimbal rotation about said output axis, an electric spin motor on said gimbal and including a stator and a rotor capable of having poles induced therein by said stator; means operatively connecting said signal generating means to said motor means; and means periodically shifting the poles of said rotor with respect to said rotor to cause a predictable spin motor reaction torque to be applied to said gimbal about said output axis.

7. Inertial apparatus comprising a support mounted for rotation about a support axis; motor means connected between said support and a base and adapted when actuated to rotate said support about said support axis relative to said base; gyroscope means mounted on said support with an input axis thereof positioned to receive a component of rotation of said support about said support axis, said gyroscope means further including a gimbal adapted to rotate about an output axis, a signal generator means adapted to produce a signal indicative of gimbal rotation about said output axis, an electric spin motor on said gimbal and including a stator and a rotor capable of having poles induced therein by said stator; means operatively connecting said signal generating means to said motor means; means periodically shifting the poles of said rotor with respect to said rotor to cause a predictable spin motor reaction torque to be applied to said gimbal about said output axis; and means applying a compensating torque to said gimbal about said output axis which is substantially equal and opposite to said predictable spin motor reaction torque.

References Cited by the Examiner

UNITED STATES PATENTS

| 2,737,054 | 3/1956 | Wendt | 74—5.47 |
| 2,835,131 | 5/1958 | Vacquier et al. | 74—5.37 |
| 2,933,925 | 4/1960 | Singleton et al. | 74—5.46 |
| 2,941,406 | 6/1960 | Singleton et al. | 74—5.37 |

FRED C. MATTERN, JR., *Primary Examiner.*

BROUGHTON G. DURHAM, *Examiner.*

T. W. SHEAR, J. D. PUFFER, *Assistant Examiners.*